(12) United States Patent
Littlejohn

(10) Patent No.: US 10,707,980 B2
(45) Date of Patent: Jul. 7, 2020

(54) SUBSTITUTING STREAMING STATION FOR OVER-THE-AIR BROADCAST

(71) Applicant: iHeartMedia Management Services, Inc., San Antonio, TX (US)

(72) Inventor: Jeffrey Lee Littlejohn, Cincinnati, OH (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 753 days.

(21) Appl. No.: 15/148,845

(22) Filed: May 6, 2016

(65) Prior Publication Data

US 2017/0324491 A1 Nov. 9, 2017

(51) Int. Cl.
| | |
|---|---|
| *G06Q 30/02* | (2012.01) |
| *H04H 20/24* | (2008.01) |
| *H04H 20/26* | (2008.01) |
| *H04L 29/08* | (2006.01) |
| *H04B 1/08* | (2006.01) |
| *H04L 29/06* | (2006.01) |
| *H04W 4/80* | (2018.01) |
| *H04H 60/44* | (2008.01) |

(52) U.S. Cl.
CPC ......... *H04H 20/26* (2013.01); *G06Q 30/0267* (2013.01); *G06Q 30/0271* (2013.01); *H04B 1/082* (2013.01); *H04H 20/24* (2013.01); *H04L 65/4076* (2013.01); *H04L 67/02* (2013.01); *H04L 67/12* (2013.01); *H04W 4/80* (2018.02); *H04H 60/44* (2013.01)

(58) Field of Classification Search
CPC combination set(s) only.
See application file for complete search history.

(56) References Cited

U.S. PATENT DOCUMENTS

| | | | |
|---|---|---|---|
| 8,918,088 B1 | 12/2014 | Thodupunoori | |
| 2008/0167957 A1* | 7/2008 | Steelberg | G06Q 30/02 705/14.64 |
| 2010/0262987 A1 | 10/2010 | Imanilov | |

(Continued)

OTHER PUBLICATIONS

An Evaluation Environment and Methodology for Automotive Media Streaming Applications, Robert Protzmann, Kay Massow, Ilja Radusch, (Year: 2014).*

(Continued)

*Primary Examiner* — Gautam Ubale
(74) *Attorney, Agent, or Firm* — Garlick & Markison; Edward J. Marshall

(57) ABSTRACT

An automotive radio receiver includes an over-the-air radio tuner and a network interface. When a broadcast received at the radio receiver, it includes embedded information that can be used to identify the radio station providing the broadcast. The radio receiver uses the embedded information to identify a streaming station that corresponds to the broadcast station. The radio receiver transmits information associated with the streaming station to a web service, which returns an address at which the radio receiver can access the streaming station. The address of the streaming station is stored in a memory accessible to the radio receiver for later use. The next time the radio receiver is tuned to the same broadcast station, the radio receiver instead connects to the streaming station at the stored address.

7 Claims, 5 Drawing Sheets

(56) References Cited

U.S. PATENT DOCUMENTS

2014/0136330 A1* 5/2014 Smereka ............ G06Q 30/0265
  705/14.62
2015/0193516 A1* 7/2015 Harb ................... G06F 16/60
  707/625
2015/0381297 A1* 12/2015 Cepuran ............... H04H 60/15
  455/352

OTHER PUBLICATIONS

Software Radio FM Broadcast Receiver for Audio Indexing Applications, B. Happi Tietche, O. Romain, B. Denbi, L. Benaroya\ F. de Dieuleveult, B. Granado, H. Khemiri, G. Chollet, D. Petrovska-Delacretaz, R. Blouet, K. Hachicha, and S. Viateur (Year: 2012).*

* cited by examiner

SUBSTITUTING STREAMING STATION FOR OVER-THE-AIR BROADCAST

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to media broadcasting, and more particularly to providing media broadcasts via a substitute medium.

2. Description of Related Art

Currently, most automobile radios tune to FM, AM, and Satellite broadcast radio, with some automobiles also having the ability to connect to streaming radio via a device such as a smartphone, onboard cellular or WiFi. Some radios can interleave or combine content received via FM, AM, or Satellite broadcasts with content received via WiFi or another non-broadcast source. For example, content received from the non-broadcast sources can be inserted into a radio broadcast being received by the automotive radio, or into a streaming internet radio station received by the automobile radio.

However, conventional methods of combining broadcast and non-broadcast content do not use the full potential of network-connected automobile radios to provide streaming content to end-users.

BRIEF SUMMARY OF THE INVENTION

The present invention is directed to apparatus and methods of operation that are further described in the following Brief Description of the Drawings, the Detailed Description of the Invention, and the claims. Various features and advantages of the present invention will become apparent from the following detailed description of the invention made with reference to the accompanying drawings.

BRIEF DESCRIPTION OF THE SEVERAL VIEWS OF THE DRAWING(S)

Figure 4:
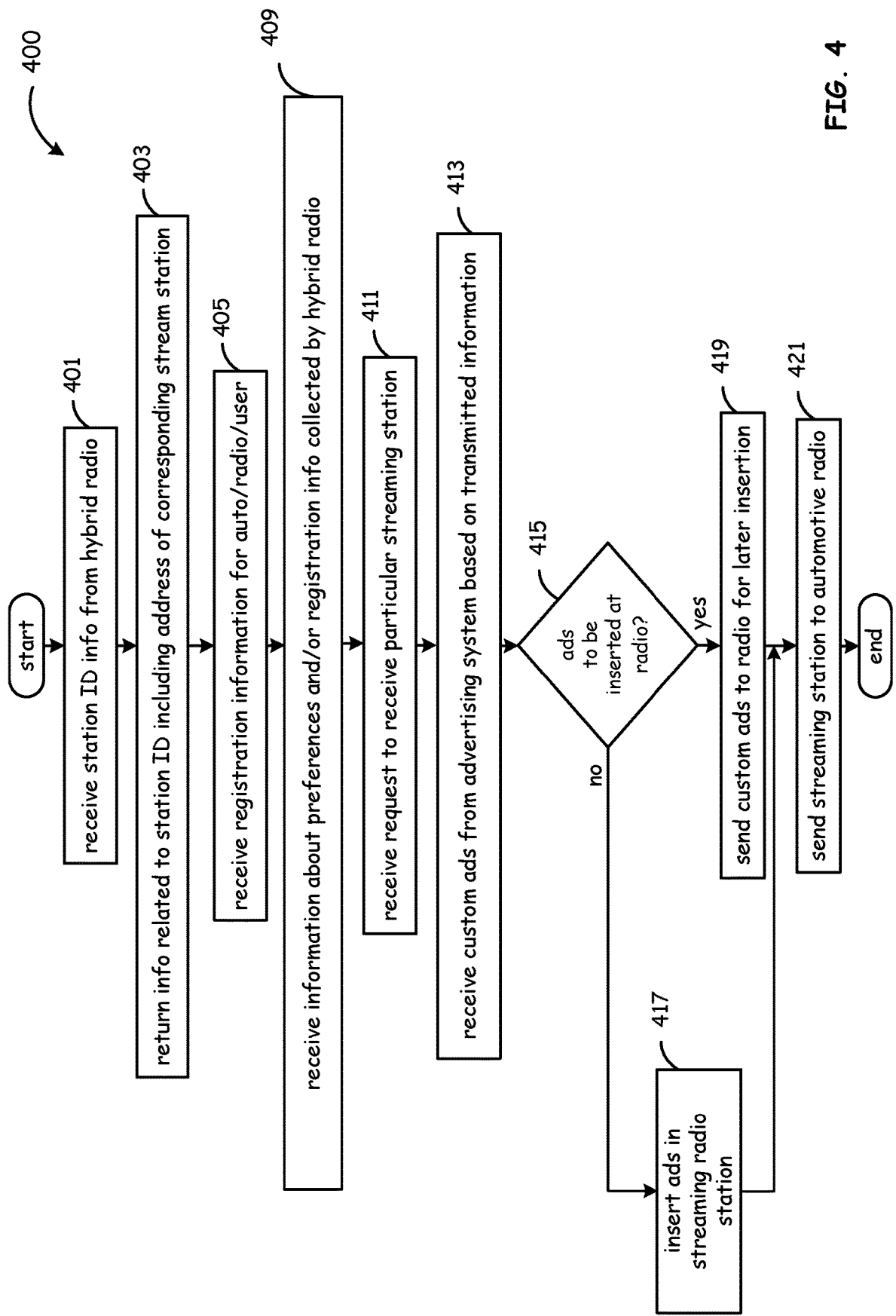
Figure 5:
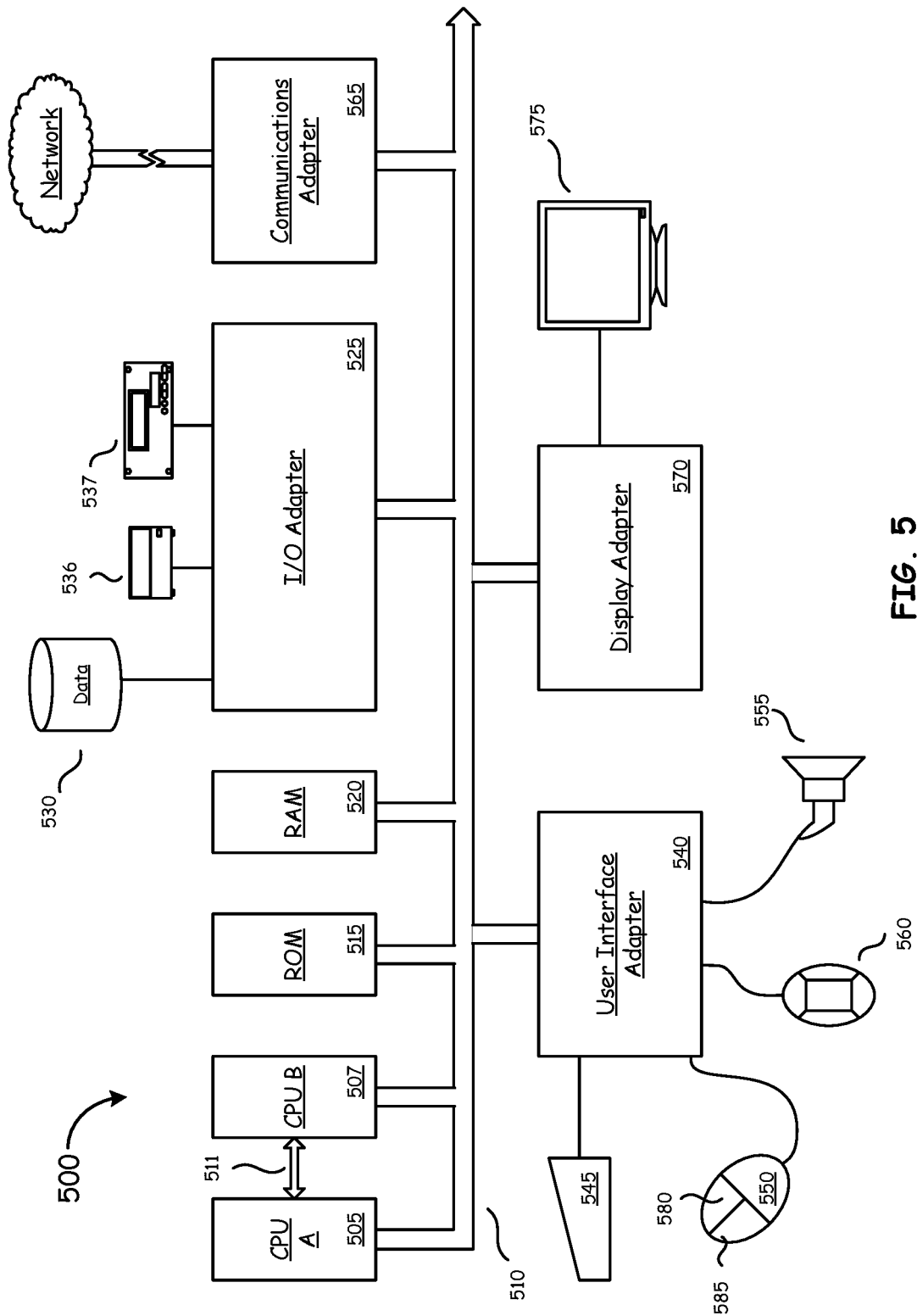

FIG. 4 is a flowchart illustrating a method that includes transmitting a replacement stream to an automotive or other hybrid radio receiver, in accordance with various embodiments of the present disclosure; and FIG. 5 is a high-level block diagram of a processing system, part or all of which can be used to implement various server, machines, systems, and hybrid radios in accordance with various embodiments of the present disclosure.

DETAILED DESCRIPTION OF THE INVENTION

In various embodiments discussed herein, an automobile radio, or other hybrid radio that includes both an over-the-air tuner and a packet-switched network interface, may collect data from an over-the-air-broadcast to identify the station to which the radio is currently tuned. The information collected can be obtained from broadcast data embedded in the broadcast using various protocols, including but not limited to Radio Data System (RDS) protocol, and information embedded in the broadcast using in-band-on-channel (IBOC) techniques such as those used in HD Radio™ transmissions. Other information collected at the automobile radio, either directly or indirectly, can include information about a currently tuned frequency, latitude and longitude, or other information that can be useful in determining a radio station identifier.

After determining the identity of the currently tuned radio station, some embodiments may determine whether the station belongs to a predetermined group of stations. For example, the station could be an iHeartMedia® station, or have some other known affiliation with a particular group or entity. This affiliation or group membership can be used, in some instances to identify a corresponding streaming station by either a web service, or locally at the automobile radio by consulting a list that cross-references over-the-air stations that are members of a group with corresponding streaming stations.

In at least one embodiment, Station ID data determined at the automobile radio can be sent to a web service via a packet-switched communication network. A network address of a corresponding streaming station determined based on the station ID, for example a return uniform resource locator (URL), can be transmitted to the automobile radio from the web service, and cached at an automobile radio head unit or at a separate memory device in communication with the radio head unit.

In various embodiments, based on the station ID and other vehicle information, the automobile and/or the head unit can be registered with the web service. Information about the driver or other user or passenger(s) of the automobile radio can be collected, either at the automobile radio itself or via another registration process, and stored at the web service along with demographics and other user preference data.

When the user next tunes to the same over-the-air station on the automobile radio, the radio can connect substantially immediately to the stream source specified by the cached URL, and present the stream to the user in place of the over-the-air broadcast.

In various embodiments, advertisements included in the stream can be based on a driver/user/passenger profile and associated demographics and preferences via an ad insertion process employing a content distribution network (CDN), for example using an ad-serving platform such as Adswizz®. Thus, in at least one embodiment, rather than substituting advertisements into an over-the-air broadcast by pausing the broadcast, overwriting portions of the broadcast, or otherwise, the entire over-the-air broadcast can be replaced by a corresponding stream that includes the desired advertisements.

Figure 1:
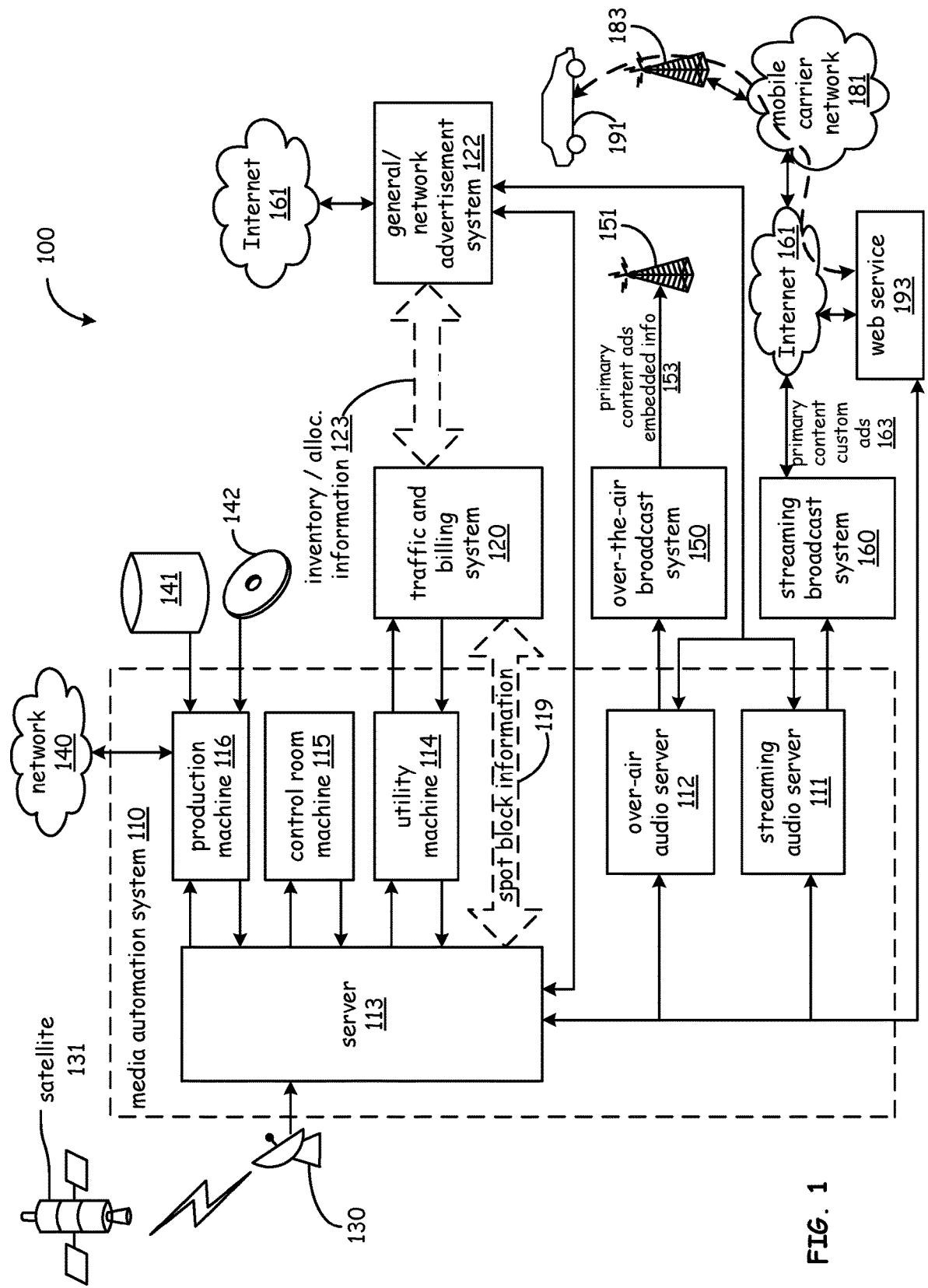
FIG. 1 is a schematic block diagram of a broadcasting system in accordance with various embodiments of the present disclosure.

Referring first to FIG. 1, a system 100 will be discussed according to various embodiments of the present disclosure. System 100 includes media automation system 110, for example a NexGen® automation system, which can control and automate various media broadcast functions; and traffic and billing system 120, for example a Viero® traffic system, which can provide control for various traffic and billing functions such as entering and editing orders, and scheduling spots. System 100 also includes streaming broadcast system 160, through which a streaming broadcast of media content can be provided to automotive radio system 191 via one or more networks, such as Internet 161 and/or mobile carrier network 181 via cell tower 183. In addition to streaming broadcast system 160, system 100 can include over-the-air broadcast system 150, through which media content is broadcast to automotive radio system 191 via broadcast tower 151.

Various media sources can also be included in system 100, for example individual source media 142, database 141, programming from another market and received via network 140, and programming broadcast via satellite 131, which can be received via satellite receiver 130. In some embodiments, although not explicitly illustrated, satellite 131 can broadcast content directly to automotive radio system 191. Although not specifically illustrated, in various embodiments a streaming station can be substituted for a satellite broadcast station by automotive radio system 191, using the same or similar techniques used for substituting the streaming station for a terrestrial over-the-air broadcast. Note that in some embodiments, over-the-air broadcasting can include both satellite-based over-the-air broadcasting and terrestrial over-the-air broadcasting.

System 100 may also include advertisement system 122, sometimes referred to as an external advertisement system, or a network advertisement system, which can be used for provisioning general advertisement content for streaming and broadcast airplay via the traffic and billing system 120. The traffic and billing system 120 and the advertisement system 122 may communicate with each other, and/or with over-air audio server 112 and/or streaming audio server 111 to coordinate local and general advertisement content.

In general, traffic and billing system 120 can be used to provide control and monitoring of the sale and scheduling of spot blocks containing one or more spots, and to determine which spot blocks are to be played on which streaming and broadcast stations at particular times. This information can be provided in the form of a log file in some embodiments. Media automation system 110 can use server 113 to gather programming and media information from various sources, and combine that information with spot block information 119 to generate a log file indicating a substantially complete representation of which media and spots are to be broadcast. The log file and related information can be provided to both over-air audio server 112 and streaming audio server 111 for broadcast over their respective systems.

Media automation system 110, as illustrated, can include production machine 116, which receives media content from network 140, database 141, individual source media 142; control room machine 115; and utility machine 114, each of which is connected to server 113. Media automation system 110 can also include over-air audio server 112, which provides media content to over-the-air broadcast system 150; and streaming audio server 111, which provides audio content to streaming broadcast system 160. Server 113 can provide audio, images, video, or mixed media content to one or both of over-air audio server 112 and streaming audio server 111. Note that even though audio servers are illustrated and discussed, the techniques and principles described herein can also be applied to images, video and mixed media content.

In at least one embodiment, one or more of the illustrated servers can be implemented as a virtual server implemented on the same hardware as another of the illustrated servers. In each case, however, implementation of a server requires the use of hardware, and general reference to a "server," unless otherwise explicitly stated or required by the context, includes hardware components used to implement the server functionality. Furthermore, various distributed processing techniques can be used to spread functionality of one or more of the illustrated servers across multiple different machines.

In various embodiments, programming provided by streaming audio server 111 to streaming broadcast system 160 can be the same programming provided by over-air audio server 112 to over-the-air broadcast system 150. In many instances, however, particular spots included in the various spot blocks provided to over-the-air broadcast system 150 and streaming broadcast system 160 can vary, even though the length and timing of the spot blocks themselves are generally consistent with each other.

A streaming station that provides substantially the same primary programming as an over-the-air station, even if some or all of the advertisements or ancillary content may be different, can be said to be a "corresponding streaming station" with respect to the over-the-air station. In general, the more closely the primary content of a streaming station matches the primary content of an over-the-air station, the more closely those stations are said to correspond. If a particular media station duplicates its primary content on a streaming station, even if advertisements and ancillary content are not exactly duplicated, or the timing of the primary content is offset or slightly altered, that streaming station can be said to be an "exactly corresponding streaming station." A streaming station that includes over 50% of the same primary content broadcast by an over-the-air station can be said to be a "loosely corresponding streaming station" to the over-the-air station. A streaming station that does not necessarily broadcast identical media items at the same time or in the same order as an over-the-air station, but that streams primary content of the same genre and style included in a broadcast of the over-the-air station, can be said to be a "tangentially corresponding streaming station" to the over-the-air station. Unless otherwise specified, reference herein to a "corresponding streaming station" can include any or all of exactly corresponding, loosely corresponding, or tangentially corresponding streaming stations.

In some embodiments, system 110 can be, for example, a radio automation system used to control media content broadcast via multiple different radio stations in a single market, with some or all system elements and subsystems co-located in a single physical facility. In other embodiments, media automation system 110 can be a radio automation system used to provide control of radio stations in different markets, in different locations, or via different distribution channels. In an illustrated embodiment, media automation system 110 is used to control media broadcast over the air via on-air broadcast system 150 and broadcast tower 151, and streaming media provided to the Internet 161 via streaming broadcast system 160. Broadcast stations and delivery media in addition to those illustrated in FIG. 1 can also be controlled by media automation system 110. It should be appreciated that media automation system 110 can also be used with television and other types of media that may broadcast programming via multiple different stations or outlets.

Media automation system 110 can obtain media to be broadcast from various sources. For example, production machine 116 can obtain information from broadcasts in other markets via network 140. Production machine 116 can also obtain media from database 141, which may be a database local to production machine 116, or local to another server or machine that is part of media automation system 110. In other embodiments database 141 can be maintained by a third-party media provider, which can be remote from media automation system 110. Production machine 116 can also obtain media to be broadcast from individual media sources, such individual source media 142, which may include any of various non-volatile media storage elements, including but not limited to optical disks, e.g. compact discs (CDs), digital video disks (DVDs), various types of magnetic and electromagnetic storage media, or the like.

Production machine 116 can provide some or all of the media to be broadcast to server 113. In addition to the media provided to server 113 from production machine 116, satellite receiver 130 can also provide satellite content to be inserted into a broadcast via over-air audio server 112 and streaming audio server 111. Server 113 can also receive media or other content to be broadcast from control room machine 115. Control room machine 115 may include a studio in which a live broadcast is being generated, such as a talk show or other similar live program, but control room machine 115 can also provide media to server 113 other than live media.

Additionally, control room machine 115 can provide server 113 with various control functions, and in some cases an operator can manually add or remove spots, programming, and other content that server 113 has previously slotted for broadcast. Thus, for example, an operator in control room machine 115 may determine that a previously scheduled spot in a particular spot block is not to be broadcast for any of various reasons. Upon making that determination, control room machine 115 can be used to send a signal to server 113. In response to the signal, server 113 can remove the spot from its previously scheduled spot block. In some embodiments, the removed, or "bumped" spot is not delivered to over-air audio server 112 for over-the-air broadcast, nor is it delivered to streaming audio server 111 for streaming broadcast.

Traffic and billing system 120 is, in some embodiments, connected to server 113 via a utility machine 114. In other embodiments, traffic and billing system may be connected to server 113 through other machines, for example a control room machine 115, production machine 116, or directly connected to server 113. In other embodiments, traffic and billing system 120 and server 113 can be included in a single machine, or collection of machines that are co-located or connected in a distributed fashion. In yet further embodiments, traffic and billing system 120 can include local instances or subsystems associated with one or more media stations, and a backend subsystem used to provide centralized control or services to each of the local instances or subsystems.

In various embodiments, spot block information 119 can include requests for identification of potential spots available for inclusion in an under-filled spot block, responses to such requests, bumped spot notifications, broadcast logs and lists, spot files, parameters related to available, unavailable, and potential spots, spot block parameters, ranks, conditional information, various status information related to spots, and the like.

Also, traffic and billing system 120 may be connected to the advertisement system 122. The advertisement system 122 can, in various embodiments, operate to provide network inventory directly to media automation system 110 for broadcast in accordance with a broadcast log specifying inventory allocations 123 generated by the traffic and billing system 120. Traffic and billing system 120 can provide the broadcast log to server 113 of media automation system 110. In some embodiments, the broadcast log can include entries that specify spots reserved for playout of local inventory by media automation system 110, and placeholder, or network, entries specifying particular portions of spot blocks reserved for playout of network inventory by advertisement system 122.

The media automation system 110 can play out media content for broadcast in accordance with the broadcast log using, for example, over-air media server 112 or streaming media server 111. Some or all of the content broadcast using over-air media server 112 and streaming media server 111 can include primary and/or advertising content delivered by server 113. In at least some embodiments, content delivered by server 113 includes separate information to be embedded in a broadcast at or near the time of broadcast by over-air media server 112, streaming media server 111, over-air broadcast system 150, or streaming broadcast system 160. In other embodiments, the content delivered by server 113 can include pre-embedded information. In at least some embodiments, broadcast servers such as over-air media server 112 and streaming media server 111, or broadcast systems such as or over-air broadcast system 150 and streaming broadcast system 160 can create and embed their own content. For example, content broadcast by over-the-air broadcast system 150 can include broadcast station content 153, which includes primary broadcast content, advertisements, and embedded information indicating the broadcast station's identity. Similarly, content broadcast by streaming broadcast system 160 can include streaming station content 163, which includes primary streaming content, and customized advertisements.

Although not necessary for implementation of some embodiments described herein, streaming station content can also include embedded information. In some embodiments if embedded information is included in streaming content 163, that embedded information can be ignored when determining whether a streaming station is considered to be a corresponding streaming station, but other embodiments can use information such as station identification and group membership information embedded in streaming content 163 to aid in making a determination about whether or not a streaming station is considered to be a corresponding streaming station of the broadcast station.

The embedded information included in broadcast station content 153 can include, but is not limited to, a station identifier such as a station call sign, a station affiliation or group membership indicator, a time stamp, or other information that can be used to identify the station broadcasting the broadcast station content 153. Information can be embedded in a broadcast signal using various techniques, including, using a Radio Data System (RDS) protocol, using in-band-on-channel (IBOC) techniques such as those used in HD Radio™ transmissions, including a non-user-perceptible watermark in the broadcast, or using various other signal encoding techniques. In at least one embodiment, the embedded information is received at automotive radio system 191 after a user tunes the automotive radio system 191 to the appropriate channel. Automotive radio system 191 can extract the embedded data and determine the identity of the broadcast station. In various implementations, identifying the broadcast station can include determining whether or not the broadcast station belongs to a particular group, or collection of stations.

Group membership or station affiliation information can be used to aid in selecting an appropriate corresponding streaming station, or in determining an address of a corresponding streaming station. For example if a broadcast station is identified as a member of group A, and group A provides a list of streaming stations that correspond to member broadcast stations, that list can be used to select a corresponding streaming station. Additionally, group A can include in its listing a level or degree of correspondence, so that if a preferred corresponding streaming station is not available, a second or subsequent choice, which may or may not have a lesser degree of correspondence, can be selected from the list. In at least one embodiment, however, identification of a group may be bypassed, especially where the broadcast station streams an exactly corresponding streaming station.

Automotive radio system 191 can use the embedded data locally to determine the identity of the broadcast station, to determine the identity of a corresponding streaming station, or in some cases even to determine an address of the corresponding streaming station. In at least one embodiment, however, automotive radio system 191 transmits information about the identity of the broadcast station to web service 193 via mobile carrier network 181, Internet 161, or some combination thereof, and web service 193 selects a corresponding streaming station, determines the network address of the corresponding streaming station, and transmits that network address back to automotive radio system 191. In some implementations, web service 193 transmits station identification alone or in conjunction with other related information to server 113, and web server 113 uses resources available to media automation system 110 to processes the information received from web service 193 and identify one or more corresponding streaming stations and network addresses associated with those corresponding streaming stations. Web server 113 can then transmit information related to the corresponding streaming stations, along with the network addresses of the corresponding streaming stations, to web service 193.

Even if web service 193 makes its determinations and selections regarding the identity and address of corresponding streaming stations independent of server 113, web service 193 can transmit information about its determinations and selections to media automation system 110, for example to server 113. The information provided by web service 193 can include information about automotive radio system 191, a user of automotive radio system 191, and in some cases various history, demographic, preference and other information such as regular passengers that can be used to allow selection of targeted advertisements to be delivered to automotive radio system 191 as part of, or in conjunction, with the selected corresponding streaming station. Media automation system 110 can provide information received from web service 193 to advertisement system 122, allowing advertisement system 122 to provide appropriately targeted advertisements to streaming audio server 111. Streaming audio server 111 can then insert the targeted advertisements into streaming station content 163, which can then be delivered to automotive radio system 191 via streaming broadcast system 160. In some embodiments, web service 193 can deliver information to advertisement system 122 via Internet 161 instead of, or in addition to, delivering that information to media automation system 110. In most embodiments, however, media automation system 110 and/or traffic and billing system 120 are informed of which advertisements are delivered to automotive radio system 191, and the identity of the streaming station into which those advertisements are inserted.

In some implementations, network advertisement system 122 can pre-deliver customized advertisements to automotive radio system 191, e.g. via streaming audio server 111, for later insertion locally into the corresponding streaming station, rather than inserting the customized advertisements into streaming station content 163.

In some embodiments, advertisement system 122 can deliver customized advertisements directly to automotive radio system 191 via Internet 161 or mobile carrier network 181 (not specifically illustrated). In those cases, advertisement system 122 could simply report to traffic and billing system 120, server 113, over-air audio server 112, streaming audio server 111, or some combination thereof, various information associated with advertisements delivered directly to automotive radio system 191. The reported information can include but is not limited to, identification of directly delivered advertisements, time-to-live associated with the advertisements, time of delivery, identification of automotive radio system 191, identification of a corresponding streaming station into which the directly delivered advertisements are to be inserted, and the like. In other embodiments, however, advertisements can be delivered to automotive radio system 191 via media delivery mechanisms associated with media automation system 110, including delivery via a content distribution network included in or associated with streaming broadcast system 160 (not specifically illustrated).

Advertisement system 122 can select custom advertisements to be inserted in streaming station content 163, or to be delivered to automotive radio system 191 for later insertion based on profile, demographic, registration, history of usage, or other information collected using automotive radio system 191, or obtained from a user or passenger profile associated with the web service 193. The collection and use of information used to select customized advertisements will be discussed in greater detail subsequently.

Various system configurations can be used to implement the teachings set forth herein, and are not limited to the exact configurations discussed with reference to FIG. 1. For example, although at least one embodiment includes separate traffic and billing systems, similar functionality can be provided using a single, integrated or system having one or more local or distributed processing, storage and communication elements. Thus, although embodiments including automation and traffic systems are primarily discussed herein, other embodiments can be implemented without the need for cooperation between separate automation and traffic systems.

Figure 2:
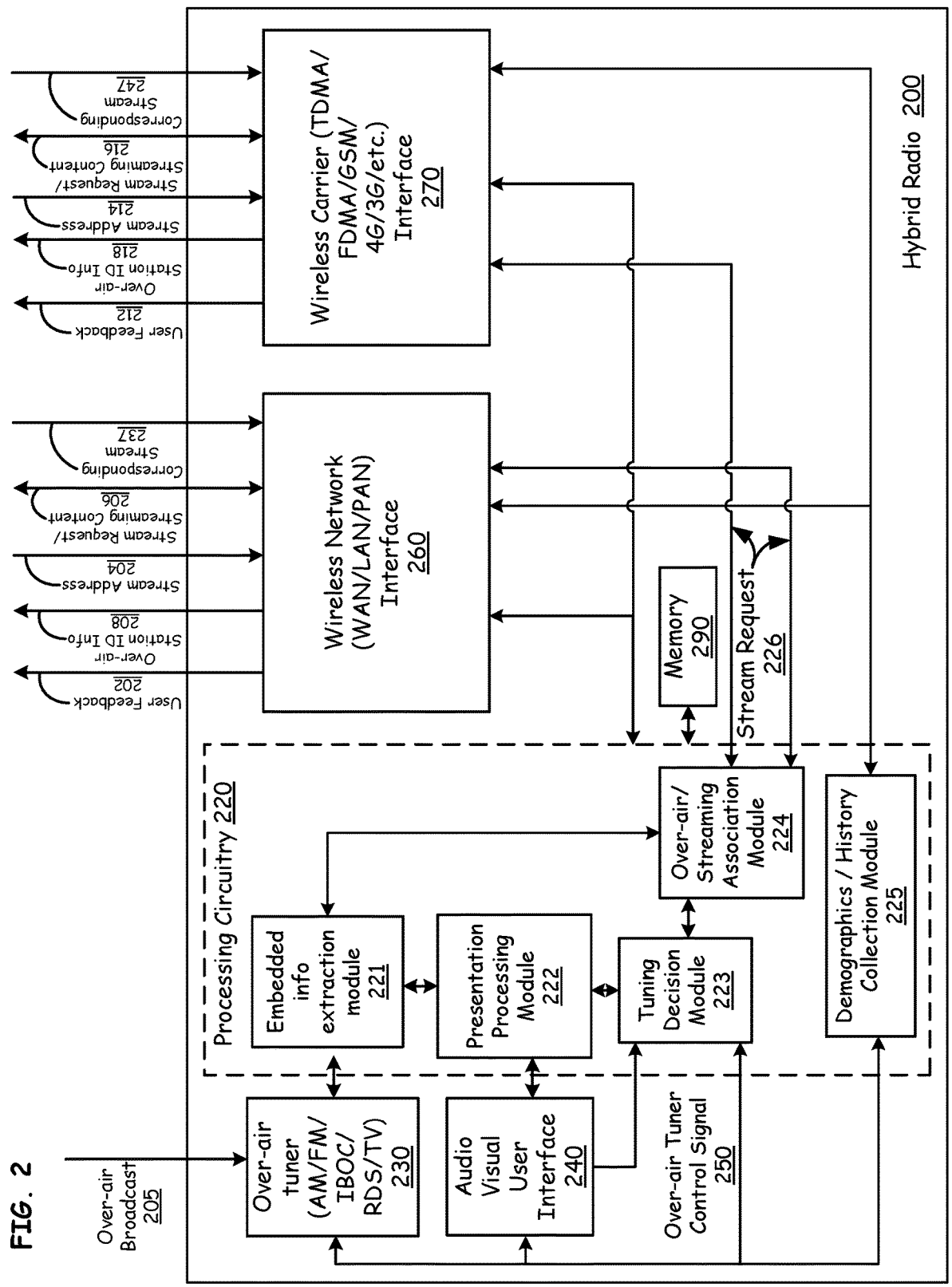
FIG. 2 is a schematic block diagram of a hybrid automotive radio or other type of media receiver having both a packet-switched network interface and an over-the-air radio tuner, in accordance with various embodiments of the present disclosure.

Referring next to FIG. 2, a hybrid radio 200 will be discussed according to various embodiments of the present disclosure. Although this disclosure focuses on an automotive radio, the teachings set forth herein can be applied to other types of hybrid radios and devices, e.g. devices including an over-the-air tuner and a network interface capable of two-way communication via a wide area network, including but not limited to "smart phones" that incorporate broadcast FM radio tuners.

Hybrid automotive radio 200 includes tuner 230, user interface 240, processing circuitry 220, memory 290, network interface 260, and wireless carrier interface 270. Tuner 230 can include radio receiver circuitry used to receive radio frequency broadcasts in the amplitude modulation (AM) band; in the frequency modulation (FM) band, including signals transmitted in accordance with in-band-on-channel (IBOC) techniques and radio data system (RDS) transmissions, and/or in other radio frequency transmission bands used to broadcast media content to consumers, including frequency bands used for broadcasting television programs. Thus, although the present disclosure focuses generally on AM/FM radio broadcasts, with a streaming radio station being substituted for an over-the-air AM/FM radio broadcast, similar techniques can be applied to television broadcasts. In some such embodiments, a streaming television station can be substituted for an over-the-air television station if hybrid radio 200 is implemented as a hybrid television set, or "smart TV," including both an over-the-air tuner and a wired or wireless network interface.

User interface 240 can include audio, video, tactile, or other input and output devices capable of obtaining information from a user, and presenting information to a user, including presentation of an over-the-air broadcast station and a streaming station.

Memory 290 can be used by processing circuitry 220 to store various information, including, but not limited to: a tuning history associated with hybrid radio 200, a location history, user demographic, preference, registration, network addresses associated with one or more streaming stations corresponding to one or more over-the-air broadcast stations, and advertisements or other primary/non-primary content to be inserted into streaming content.

Network interface 260 can be a wired (not explicitly illustrated) or wireless network interface that communicates via a packet switched network according to various communication standards such as IEEE 802.xx, which specifies communication standards such as 802.11 for wireless local area networks (WLAN), IEEE 802.3 for Ethernet, and IEEE 802.15 for personal area networks, or the like. Wireless carrier interface 270 can allow communication using any of various protocols used by cellular/mobile phone carriers to allow the transmission of data between mobile devices, or between mobile devices and the Internet. Such communication standards can include General Packet Radio Service (GPRS), Global System for Mobile communication (GSM), Universal Mobile Telecommunications Service (UMTS), Code Division Multiple Access (CDMA), Frequency Division Multiple Access (FDMA), Long Term Evolution (LTE), or the like.

Processing circuitry 220 can include extraction module 221, presentation module 222, tuning decision module 223, association module 224, and collection module 225. In operation, tuner 230 may receive an over-the-air broadcast from a tuned broadcast station, and then may demodulate the station and provide the demodulated output to processing circuitry 220 and/or interface 240. In some embodiments, tuner 230 includes all of the necessary circuitry and software to generate user-perceptible output, without assistance from processing circuitry 220. In other embodiments, presentation module 222 can process the demodulated output of tuner 230, and deliver broadcast station content to interface 240 for output and presentation to a user. In various embodiments, even if tuner 230 provides its output directly to interface 240, the demodulated output can also be sent to extraction module 221, where information embedded in the over-the-air broadcast signal can be extracted. Note that in some cases where embedded information is received in a sideband, or otherwise requires additional decoding prior to being processed, tuner 230 can be used in conjunction with extraction module 221 to extract the embedded information from the broadcast signal. Signal processing techniques can include, but are not limited to watermark detection.

The embedded information extracted from the demodulated signal by extraction module 221 can be delivered to association module 224, while the primary and/or advertising content can be delivered to presentation module 222 for any further processing needed before delivering the broadcast content to interface 240. The embedded information extracted by extraction module 221 can include station identification and/or other information used by association module 224 to determine a broadcast station's identity, and eventually determine an address of a corresponding streaming station.

Association module 224 can compare station identification or other information received from extraction module 221 with a list of stations stored in memory 290 to determine whether the station to which hybrid radio 200 is tuned is associated or affiliated with a known group of stations having known corresponding streaming stations. In some embodiments, the list of stations can include data linking known broadcast stations to one or more corresponding streaming stations, and a network address of a corresponding streaming stations can be determined based on a table lookup. In some embodiments, the table lookup performed by association module 224 to select a corresponding streaming station can include, but is not limited to: correlating a station ID with a location included in embedded information, correlating a station ID and a current location of hybrid radio 200, correlating a station ID with a tuning history and a current time and/or location, correlating genre or other station information with user preferences, or some combination thereof.

In various implementations, association module 224 can transmit a request, via network interface 260 or wireless carrier interface 270, for a web service to provide a network address of a corresponding streaming station. The request can include a request to more fully identify the broadcast station to which hybrid radio 200 is tuned, a request to provide information about one or more streaming stations corresponding to an already identified broadcast station, a request for an address of an already identified corresponding streaming station, or some combination thereof. In some embodiments, a request for a web service to determine a corresponding streaming station can be made if a local attempt is unsuccessful, or as a verification that the local process has identified an appropriate corresponding streaming station.

In some implementations, during a time when hybrid radio 200 is tuned to a broadcast station, association module 224 can determine and store uniform resource locators or other network addresses associated with one or more streaming stations that correspond to the currently-tuned broadcast station. When the hybrid radio 200 is next instructed to tune to that broadcast station, sometimes referred to herein as a "tuning event," decision module 223 makes a determination regarding whether hybrid radio 200 should actually tune to the broadcast station using tuner 230, or whether hybrid radio 200 should instead access the corresponding streaming station via network interface 260 or wireless carrier interface 270, in both cases using the network address stored in memory 290. Decision Module 223 can, in some embodiments, control whether tuner 230 tunes to the broadcast station as requested using over-air tuner control signal 250.

The decision about whether to tune to the broadcast station using tuner 230 or to present a corresponding streaming station can be based, at least in part, on factors including, but not limited to: user preferences, a tuning history associated with a user of hybrid radio 200, availability or quality of the broadcast station, availability of one or more corresponding streaming stations, the level of correspondence of available streaming stations, a time of day, a location of hybrid radio 200, whether or not a particular user or passenger is known or assumed to be using the hybrid radio 200, whether or not a user or passenger is logged into a media service providing corresponding streaming stations, whether or not available streaming stations are affiliated or otherwise belong to the same group as the broadcast station, a data usage level, speed, or cap associated with a wireless carrier account, or a "streaming substitution" setting associated with hybrid radio 200 that can specify if or when streaming substitution should, must, or can be performed. In at least some embodiments, accessing the corresponding streaming station in response to detecting a tuning event is the default action, unless overridden by a user.

In various embodiments, some or all of the information used by decision module 223 can be obtained from web service 193, another service to which a user of hybrid radio 200 belongs, from collection module 225, or some combination of these and other sources. In at least one embodiment, collection module 225 can locally collect information including, but not limited to: user preferences, a tuning history and usage patterns, location information, time and date information, signal quality information, and the like. Collection module 225 can associate and correlate collected information, for example to determine, a location or time of day at which a user or passenger typically switches from a corresponding stream back to a broadcast station, if different corresponding streaming stations are presented at different locations, which corresponding streaming station presents media items that are tagged more frequently, whether a different user is operating hybrid radio 200 at different times or location, whether a particular passenger or driver of a vehicle in which hybrid radio 200 is located typically initiates tuning events. Information collected or generated by collection module 225 can be stored in memory 290 for later use by tuning decision module 223 or association module 224. In addition to storing information in memory 290, collection module 225 can send some or all of the information collected to web service 193 via network interface 260 or wireless carrier interface 270.

The following non-limiting example illustrates basic operational principles of various embodiments. Hybrid radio 200 receives over-air broadcast 205. Tuner 230 demodulates the signal, strips the carrier, and sends the informational content of over-air broadcast 205 to extraction module 221. Extraction module 221 extracts information embedded in over-air broadcast 205, and sends primary content and any advertisements included in over-air broadcast 205 to presentation module 222. Presentation module 222 formats, translates, decodes or otherwise processes content for playout to a user via interface 240. At the same time, extraction module 221 transmits to association module 224 embedded information indicating the identity of the broadcast station transmitting over-air broadcast 205.

Continuing with the same non-limiting example, association module 224 transmits, to a web service, over-air station ID information 208 via network interface 260, or over-air station ID information 218 via network interface 270. In response to transmitting the station ID information, association module 224 receives back from the web service either stream address 204 (if network interface 260 is used) or stream address 214 (if network interface 260 is used). Stream addresses 204 and 214 include, in at least one embodiment, the network address of one or more streams corresponding to the currently tuned broadcast station. Association module 224 stores the stream address in memory 290.

Collection module 225 is generally, though not necessarily, operating substantially continuously whenever hybrid radio 200 is powered on. Collection module 225 can periodically, in response to a request, in response to user interaction with interface 240, or otherwise, transmit user feedback 202 or 212 to web service 193, and store information associated with user feedback to memory 290 for use by tuning decision module 223 and/or association module 224.

Continuing with the same non-limiting example, at some later time, for example after powering down then re-powering hybrid radio 200, or after the user tunes-away from the current broadcast station to another station, decision module 223 detects a tuning event in which hybrid radio 200 is again being tuned to the original broadcast station. Decision module 223, after determining that the address of an available corresponding streaming station is stored in memory 290, notifies association module 224 that it should transmit stream request 226, which can include a request for streaming content 206 (if using network interface 260), or request for streaming content 216 (if using wireless carrier interface 270) to the address stored in memory 290. In response to the request for streaming content, hybrid radio 200 receives corresponding stream 237 or 247, and presentation module 222 transmits the streaming content to interface 240 in place of the demodulated broadcast data from over-air broadcast 205.

Figure 3:
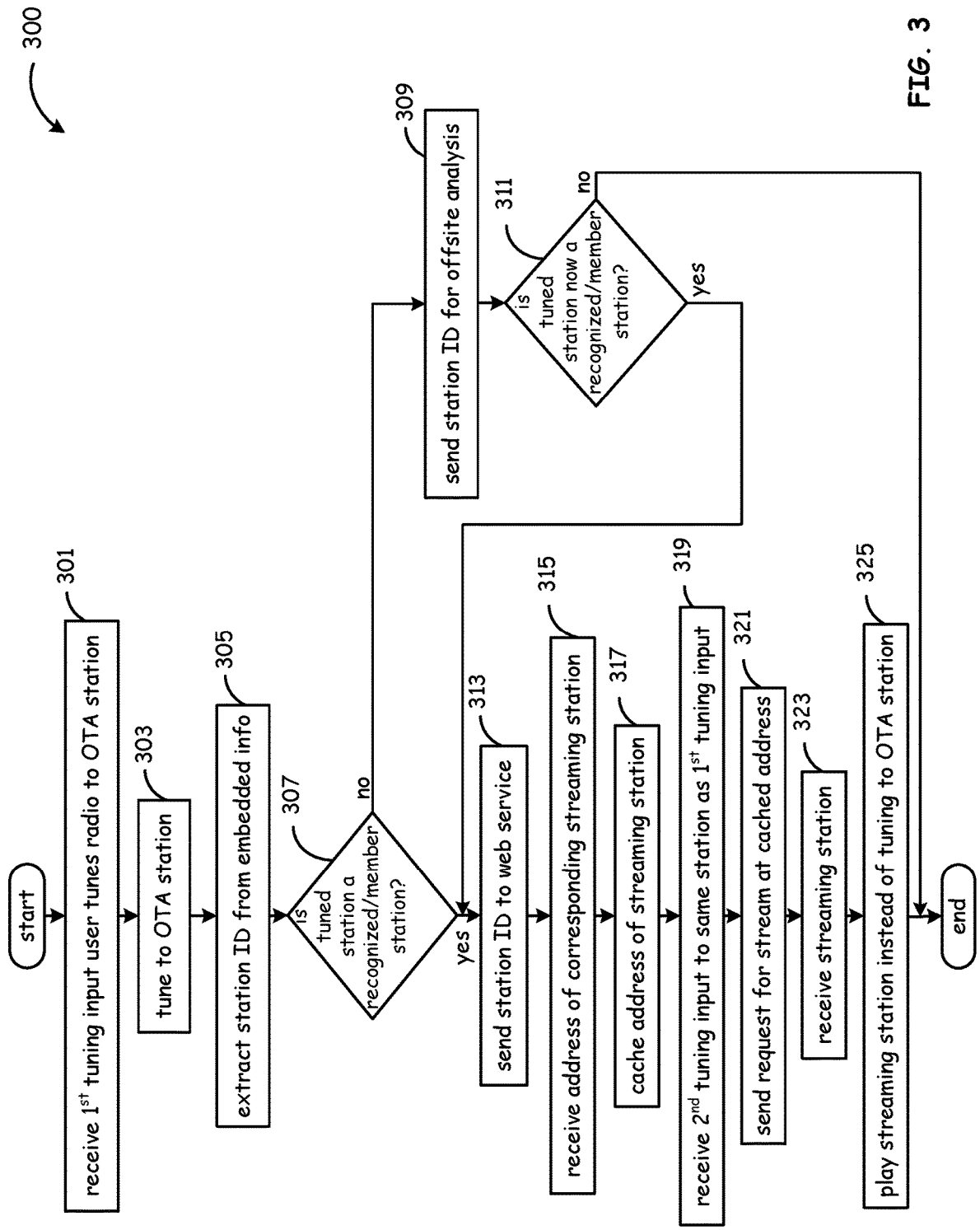
FIG. 3 is a flowchart illustrating a method in which a streaming station including custom-targeted advertisements is substituted for a broadcast station use in an automotive or other hybrid radio receiver, in accordance with various embodiments of the present disclosure.

Referring next to FIG. 3 a method 300, in which a streaming station including custom-targeted advertisements may be substituted for a broadcast station use in an automotive or other hybrid radio receiver, will be discussed in accordance with various embodiments of the present disclosure. As illustrated by block 301, first tuning input can be received at a hybrid media device such as a hybrid automotive radio. The first tuning input may instruct the hybrid automotive radio to tune to a broadcast media station, and can be considered to be a first tuning event. As illustrated by block 303, the hybrid automotive radio may respond to the first tuning input by causing a broadcast tuner included in the hybrid automotive radio to tune to the selected broadcast station.

As illustrated at block 305, a station ID or other information that can be used to identify the currently tuned broadcast station can be extracted from the signal broadcast by the selected broadcast station. As illustrated by block 307, the identity of the station, as determined by the information extracted from broadcast signal, can be checked to determine whether or not the broadcast station is recognized locally by the hybrid automotive radio as a member of a particular group of broadcast stations having corresponding streaming media stations. If the hybrid automotive radio does not recognize the broadcast station as a group member, the station ID can be sent offsite for analysis, as illustrated at block 309. The offsite analysis can be made, for example, by a media automation system or a web service, and can include an offsite determination about whether the tuned broadcast station is a recognized group member, as illustrated by block 311.

In some embodiments, if neither the local determination at block 307, nor the offsite determination at block 311 recognize the station ID as a member of a group of broadcast stations having corresponding streaming media stations, method 300 ends. If either the local determination at block 307, or the offsite determination at block 311, results in recognition of the currently tuned broadcast station as a group member, the station ID can be sent to a web service, as illustrated at block 313, for the web service to select a corresponding streaming station. Note that in some embodiments, although not explicitly illustrated, a corresponding streaming station can be selected even if the broadcast station is not a recognized group member.

As illustrated at block 315, the web service can send a URL or other network address of the corresponding streaming station to the hybrid automotive radio, which can cache the address or place the address into longer-term storage accessible to the hybrid automotive radio, as illustrated at block 317. As illustrated at block 319 second tuning input can be received at the hybrid automotive radio at a later point in time, after the address of the corresponding streaming station has been stored. The second tuning input, sometimes referred to as a second tuning event, may instruct the hybrid automotive radio to tune to the same broadcast station indicated by the first tuning input.

As illustrated by block 321, in response to the second tuning event, the hybrid automotive radio may send a message to the stored address, the message requesting the corresponding streaming station to be streamed to the hybrid automotive radio. As illustrated at block 323, the corresponding streaming station can be received at the hybrid automotive radio. The corresponding stream can be played out instead of tuning to the broadcast station, as illustrated by block 325. The end result is that, a corresponding streaming station can be substituted for an over-the-air broadcast station in response to a request to tune the hybrid automotive receiver to a particular broadcast station.

Referring next to FIG. 4, a method 400 a method of transmitting a replacement stream to an automotive or other hybrid radio will be discussed in accordance with various embodiments of the present disclosure. As illustrated at block 401, a web service can receive, from a hybrid automotive radio, a station identifier identifying an over-the-air broadcast station. In response to receiving the station identifier, the web service can return an address of one or more corresponding streaming stations, as illustrated at block, 403.

The web service can also receive from the hybrid automotive radio, as illustrated by block 405, registration information associated with an automobile in which the hybrid automotive radio is installed, the hybrid automotive radio itself, a user of the hybrid automotive radio, passenger in the vehicle, or some combination thereof. The hybrid automotive radio can also collect preference and historical information associated with the automobile, the hybrid automotive radio, and one or more users, and send that information to the web service. As illustrated at block 409, the web service can receive the information collected by the hybrid automotive radio, and forward that information to an advertising system, a traffic and billing system, a media automation system, or some combination thereof. The information collected by the hybrid automotive radio can be used to select advertisements targeted to a user of the hybrid automotive radio for insertion into one or more spots in any corresponding streaming station eventually delivered to the hybrid automotive radio.

As illustrated at block 411, a request for a particular streaming station can be received from the hybrid automotive radio. Additionally, custom advertisements selected based on the information collected by the hybrid automotive radio can be received from an advertising system, as illustrated at block 413. As illustrated by block 415, a check can be made to determine whether some or all of the custom advertisements are to be inserted at the hybrid automotive radio, or whether the advertisements are to be inserted into the corresponding streaming station prior to streaming the corresponding station to the hybrid automotive radio.

If it is determined at block 415 that the custom advertisements are to be inserted into the stream by the hybrid automotive device, custom advertisements can be delivered to the hybrid automotive radio for storage and later insertion, as illustrated at block 419. If it is determined at block 415 that the custom advertisements are to be inserted into the stream prior to transmitting the stream to the hybrid automotive radio, the web service, a media automation system, or a content distribution network can insert the custom advertisements into the stream, as illustrated by block 417. Note that in some embodiments, a web service coordinates with various portions of a media automation system and/or a content distribution network to implement one or more portions of method 400.

As illustrated at block 421, the requested streaming station can be transmitted to the automotive radio, either with or without custom advertisements already included in the stream.

Referring now to FIG. 5, a high-level block diagram of a processing system is illustrated and discussed. Processing system 500 includes one or more central processing units, such as CPU A 505 and CPU B 507, which may be conventional microprocessors interconnected with various other units via at least one system bus 510. CPU A 505 and CPU B 507 may be separate cores of an individual, multi-core processor, or individual processors connected via a specialized bus 511. In some embodiments, CPU A 505 or CPU B 507 may be a specialized processor, such as a graphics processor, other co-processor, or the like.

Processing system 500 includes random access memory (RAM) 520; read-only memory (ROM) 515, wherein the ROM 515 could also be erasable programmable read-only memory (EPROM) or electrically erasable programmable read-only memory (EEPROM); input/output (I/O) adapter 525, for connecting peripheral devices such as disk units 530, optical drive 536, or tape drive 537 to system bus 510; a user interface adapter 540 for connecting keyboard 545, mouse 550, speaker 555, microphone 560, or other user interface devices to system bus 510; communications adapter 565 for connecting processing system 500 to an information network such as the Internet or any of various local area networks, wide area networks, telephone networks, or the like; and display adapter 570 for connecting system bus 510 to a display device such as monitor 575. Mouse 550 has a series of buttons 580, 585 and may be used to control a cursor shown on monitor 575.

It will be understood that processing system 500 may include other suitable data processing systems without departing from the scope of the present disclosure. For example, processing system 500 may include bulk storage and cache memories, which provide temporary storage of at least some program code in order to reduce the number of times code must be retrieved from bulk storage during execution.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A broadcasting system for use with a radio receiver, the system comprising:
    a processing device configured to implement a web service;
    a media automation system coupled to an on-air broadcast system, and to the web service, and wherein the media automation system is coupled to an automotive radio receiver through a mobile device paired to the automotive radio receiver via a personal area network;
    the on-air broadcast system broadcasting an on-air radio station in a particular over-the-air frequency band, the on-air radio station including media content and embedded information at least partially identifying the on-air radio station;
    the media automation system further configured to:
    receive station identification information from a radio receiver, the station identification information identifying a radio station to which the radio receiver is tuned;
    make a determination, based on the station identification information, that the radio receiver is tuned to a broadcast station that is a member of a group of radio stations having corresponding streaming media stations;
    provide a result of the determination to the radio receiver, wherein the radio receiver uses the result to determine whether to request the web service to provide a streaming media station corresponding to the on-air radio station; and
    the web service configured to transmit, to the radio receiver, a network address of the streaming media station corresponding to the on-air radio station in response to receiving a request for a streaming media station from the radio receiver.

2. The broadcasting system of claim 1, further comprising:
    a streaming broadcast system coupled to the media automation system, the streaming broadcast system configured to transmit the streaming media station corresponding to the on-air radio station, to the radio receiver, in response to receiving a request addressed to the network address.

3. The broadcasting system of claim 1, wherein the media automation system receives preference information from the radio receiver.

4. The broadcasting system of claim 3, the media automation system transmits the preference information to an advertisement targeting system.

5. The broadcasting system of claim 1, wherein the embedded information is transmitted using at least one of a Radio Data System (RDS) protocol or an in-band on-channel (IBOC) radio protocol.

6. The broadcasting system of claim 1, wherein the media automation system is further configured to:
    receive, from an advertisement targeting system, at least one item of customized advertisement content; and
    transmit the at least one item of customized advertisement content, via a packet switched network, to the radio receiver, wherein the radio receiver caches the at least one item of customized advertisement content for playback during playout of a streaming radio station.

7. The broadcasting system of claim 1, further comprising:
    a streaming broadcast system coupled to the media automation system, the streaming broadcast system configured to:
    receive, from an advertisement targeting system, at least one item of customized advertisement content; and
    transmit the at least one item of customized advertisement content to the radio receiver as part of a corresponding streaming radio station.

* * * * *